United States Patent
Li et al.

(10) Patent No.: US 10,939,085 B2
(45) Date of Patent: Mar. 2, 2021

(54) THREE DIMENSIONAL GLASSES FREE LIGHT FIELD DISPLAY USING EYE LOCATION

(71) Applicant: INTEL CORPORATION, Santa Clara, CA (US)

(72) Inventors: Tuotuo Li, Santa Clara, CA (US); Joshua J. Ratcliff, San Jose, CA (US); Qiong Huang, Houston, TX (US); Alexey M. Supikov, San Jose, CA (US); Ronald T. Azuma, San Jose, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 16/662,156

(22) Filed: Oct. 24, 2019

(65) Prior Publication Data
US 2020/0204781 A1   Jun. 25, 2020

Related U.S. Application Data

(63) Continuation of application No. 15/787,947, filed on Oct. 19, 2017, now abandoned.

(51) Int. Cl.
*H04N 13/144* (2018.01)
*G06F 3/048* (2013.01)
(Continued)

(52) U.S. Cl.
CPC ........... *H04N 13/144* (2018.05); *G06F 3/048* (2013.01); *G06T 15/06* (2013.01); *G06T 15/50* (2013.01);
(Continued)

(58) Field of Classification Search
CPC ......... G06F 3/013; G06F 3/048; G06T 15/06; G06T 15/50; H04N 13/106; H04N 13/139;
(Continued)

(56) References Cited

U.S. PATENT DOCUMENTS 6,343,862 B1   2/2002  Sawai et al.
7,589,900 B1 *  9/2009  Powell ............... G02B 27/0101
                                                        359/622
(Continued)

FOREIGN PATENT DOCUMENTS

WO   2009091563 A1   7/2009
WO   2018063579 A1   4/2018

OTHER PUBLICATIONS

International Search Report for related PCT Application PCT/US20171047785 with a completion date of Nov. 27, 2017 and dated Dec. 1, 2017, 5 pages.
(Continued)

*Primary Examiner* — Jessica M Prince
(74) *Attorney, Agent, or Firm* — Hanley, Flight and Zimmerman, LLC

(57) ABSTRACT

In some examples, a three dimensional display system includes a display (for example, a display screen or a display panel), a micro lens array, and an eye tracker to track one or more eyes of a person and to provide eye location information. The display system also includes a rendering processor to render or capture color plus depth images (for example, RGB-D images) or light field images. The display system also includes a light field processor to use the eye location information to convert the rendered color plus depth images or light field images to display images to be provided to the display.

32 Claims, 10 Drawing Sheets

(51) Int. Cl.
| | |
|---|---|
| *H04N 13/307* | (2018.01) |
| *H04N 13/106* | (2018.01) |
| *H04N 13/305* | (2018.01) |
| *H04N 13/383* | (2018.01) |
| *H04N 13/324* | (2018.01) |
| *H04N 13/139* | (2018.01) |
| *G06T 15/06* | (2011.01) |
| *G06T 15/50* | (2011.01) |

(52) U.S. Cl.
CPC ......... *H04N 13/106* (2018.05); *H04N 13/139* (2018.05); *H04N 13/305* (2018.05); *H04N 13/307* (2018.05); *H04N 13/324* (2018.05); *H04N 13/383* (2018.05)

(58) Field of Classification Search
CPC .. H04N 13/144; H04N 13/305; H04N 13/307; H04N 13/324; H04N 13/38
See application file for complete search history.

(56) References Cited

U.S. PATENT DOCUMENTS

| | | |
|---|---|---|
| 9,116,337 B1 | 8/2015 | Miao |
| 9,182,817 B2 | 11/2015 | Ratcliff et al. |
| 9,262,696 B2 | 2/2016 | Ratcliff et al. |
| 9,361,718 B2 | 6/2016 | Lyons et al. |
| 10,341,633 B2 | 7/2019 | Lindner et al. |
| 2012/0013603 A1 | 1/2012 | Liu |
| 2013/0135299 A1 | 5/2013 | Park et al. |
| 2013/0170031 A1 | 7/2013 | Bohn et al. |
| 2014/0055578 A1 | 2/2014 | Wu et al. |
| 2014/0118512 A1* | 5/2014 | Park ............ H04N 13/31 348/54 |
| 2014/0132742 A1 | 5/2014 | Liu et al. |
| 2014/0168395 A1* | 6/2014 | Iwane .......... H04N 13/307 348/59 |
| 2014/0293018 A1 | 10/2014 | Pasquier et al. |
| 2015/0049176 A1 | 2/2015 | Hinnen et al. |
| 2015/0261185 A1 | 9/2015 | Krause |
| 2016/0042501 A1 | 2/2016 | Huang et al. |
| 2016/0165205 A1 | 6/2016 | Liu et al. |
| 2016/0209647 A1* | 7/2016 | Fursich ............ G02B 27/0093 |
| 2016/0330432 A1 | 11/2016 | Yu et al. |
| 2018/0040274 A1 | 2/2018 | Kurokawa |
| 2018/0091800 A1 | 3/2018 | Ratcliff et al. |
| 2020/0073120 A1* | 3/2020 | von Spiegel ....... G02B 27/0101 |

OTHER PUBLICATIONS

United States Patent and Trademark Office,"Notice of Allowance," issued in connection with U.S. Appl. No. 15/787,947, dated Jul. 25, 2019, 19 pages.

United States Patent and Trademark Office,"Non-Final Office action," issued in connection with U.S. Appl. No. 15/787,947, dated Apr. 2, 2019, 18 pages.

* cited by examiner

100

200

700

THREE DIMENSIONAL GLASSES FREE LIGHT FIELD DISPLAY USING EYE LOCATION

CROSS REFERENCE TO RELATED APPLICATIONS

The present application is a Continuation application of U.S. patent application Ser. No. 15/787,947, Tuotuo Li et al., entitled "THREE DIMENSIONAL GLASSES FREE LIGHT FIELD DISPLAY USING EYE LOCATION," filed Oct. 19, 2017, and which is incorporated herein by reference.

TECHNICAL FIELD

This disclosure relates generally to three dimensional (3D) display.

BACKGROUND

Technology needed to deliver stereo three dimensional (3D) video content such as 3D TV, cinema, gaming, etc. has increasingly entered mass market products (for example, such as Virtual Reality, 3D Cinema, 3D smartphones, etc.) Some stereo 3D displays such as active/passive glasses-based, multi-view lenticular, etc. deliver a different image to each eye in a stereo pair. These independent images can be, for example, stereoscopically fused in a user's brain, effectively re-creating a binocular experience of 3D visual perception.

In real world situations, when a human is observing a particular subject, for example, their eyes both converge and focus (or accommodate) to the distance of the subject. However, in many stereo three dimensional displays, a user is not able to converge and focus (or accommodate) to the distance of the subject.

BRIEF DESCRIPTION OF THE DRAWINGS

The following detailed description may be better understood by referencing the accompanying drawings, which contain specific examples of numerous features of the disclosed subject matter.

In some cases, the same numbers are used throughout the disclosure and the figures to reference like components and features. In some cases, numbers in the 100 series refer to features originally found in FIG. 1; numbers in the 200 series refer to features originally found in FIG. 2; and so on.

DESCRIPTION OF THE EMBODIMENTS

Some embodiments relate to three dimensional (3D) display. Some embodiments relate to 3D display with eye tracking (and/or with pupil tracking). Some embodiments relate to a 3D display that solves convergence and accommodation issues.

In three dimensional displays, a user may not be able to converge and focus (or accommodate) to the distance of the subject. This can be referred to as a vergence-accommodation conflict that can occur in 3D displays, and can also be referred to as a convergence-accommodation conflict. This conflict relates to eye focus and convergence issues, and can cause eye fatigue, dizziness, nausea, etc., particularly after extended use. Tensor displays can sometimes solve convergence and accommodation (focus) problems, but the efficiency of such a display can be very low. These displays can suffer from diffraction, Moire, etc., and can require a large amount of computation for optimization purposes. Volumetric displays can be bulky, and often require moving mechanical parts. Many volumetric displays also do not support occlusion, and can suffer from reduced visual quality such as being unable to render color images.

In some embodiments, a three dimensional display system can be implemented that is bright, presents full color images, and allows for correct occlusion. In some embodiments, a three dimensional display can be compact but still have a large depth field.

Figure 1:
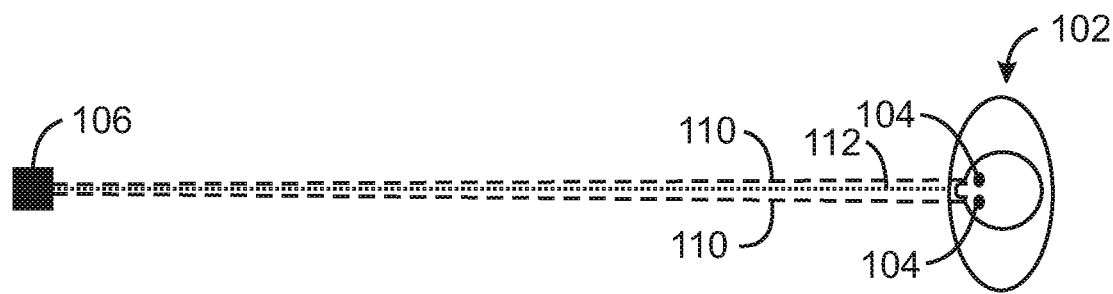
FIG. 1 illustrates a real world viewing environment.

FIG. 1 illustrates an environment 100 (for example, a "real world" environment) including a user 102 (or viewer 102). The user 102 has eyes 104. The user's eyes 104 look out toward an object 106 (for example, a real world object 106) along lines of vision illustrated by dotted lines 110 in FIG. 1. Dotted line 112 illustrates a focus line ending at a focus point at object 106. Dotted lines 110 end at a convergence point that is also at object 106. In some embodiments, environment 100 illustrates real three dimensional (3D) vision in physical space. The convergent point and the focus point in FIG. 1 are on the same depth plane. That is, the convergent point and the focus point in the real world environment 100 is the same (for example, at a real world object 106).

Figure 2:
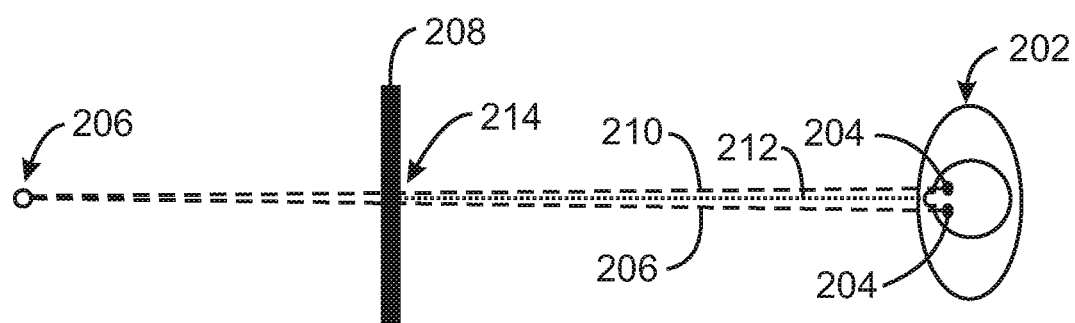
FIG. 2 illustrates a three dimensional (3D) display viewing environment.

FIG. 2 illustrates an environment 200 (for example, a three dimensional display environment) including a user 202 (or viewer 202). The user 202 has eyes 204. The user's eyes 204 look out toward an apparent location of a three dimensional (3D) displayed object 206 displayed on a three dimensional (3D) display screen 208 along lines of vision illustrated by dotted lines 210 in FIG. 2. Dotted line 212 illustrates a focus line ending at a three dimensional (3D) focus point (for example, a focus or accommodation point 214) at 3D display screen 208. Dotted lines 210 end at a convergence point that is at the apparent location of the displayed 3D object 206. In some embodiments, environment 200 illustrates three dimensional (3D) vision by a user 202 viewing an apparent object 206 being displayed on a 3D display screen 208. In some embodiments, the eyes 204 of the user 202 are forced to decouple the focus point on the 3D display screen 208 from the convergence point at the apparent location of the 3D object 206. This is known as vergence-accommodation conflict, convergence-accommodation conflict, and/or a convergence and accommodation conflict problem, for example.

In real world environments such as, for example, environment 100 of FIG. 1, when a human user is observing a particular subject, for example, where the eyes of the user both converge and focus (or accommodate) to the distance of the subject (for example, real world object 106). However, in many stereo three dimensional display environments such as, for example, environment 200 of FIG. 2, a user is not able to converge and focus (or accommodate) to the distance of the apparent location of the subject (for example, to the apparent location 206 of the three dimensionally displayed object).

In some three dimensional (3D) display systems, the user's eyes must accommodate to a single focal plane (for example, the focal plane of 3D display screen 208) in order to see a scene in focus. In the case of 3D video such as 3D television (TV) or a 3D movie, for example, the focal plane is the physical display screen itself. However, the user's eyes may converge to one or more apparent locations of one or more 3D objects being displayed. These apparent locations can be in front of and/or behind the screen. The distance from the user's eyes to the display screen and the distance from the user's eyes to the apparent location(s) of the 3D object(s) appearing in front of and/or behind the screen will not match in many situations. This mismatch of distance from the eyes to the focus point (or accommodation point) at the display screen and the distance from the eyes to the 3D convergence point(s) at the apparent location(s) of displayed 3D objects can be referred to as the convergence-accommodation conflict (or the vergence-accommodation conflict, or the convergence and accommodation conflict problem). As a result of this conflict, the user may experience headaches, fatigue, eyestrain, etc. This problem may cause health implications, particularly among children whose visual systems are still developing.

Figure 3:
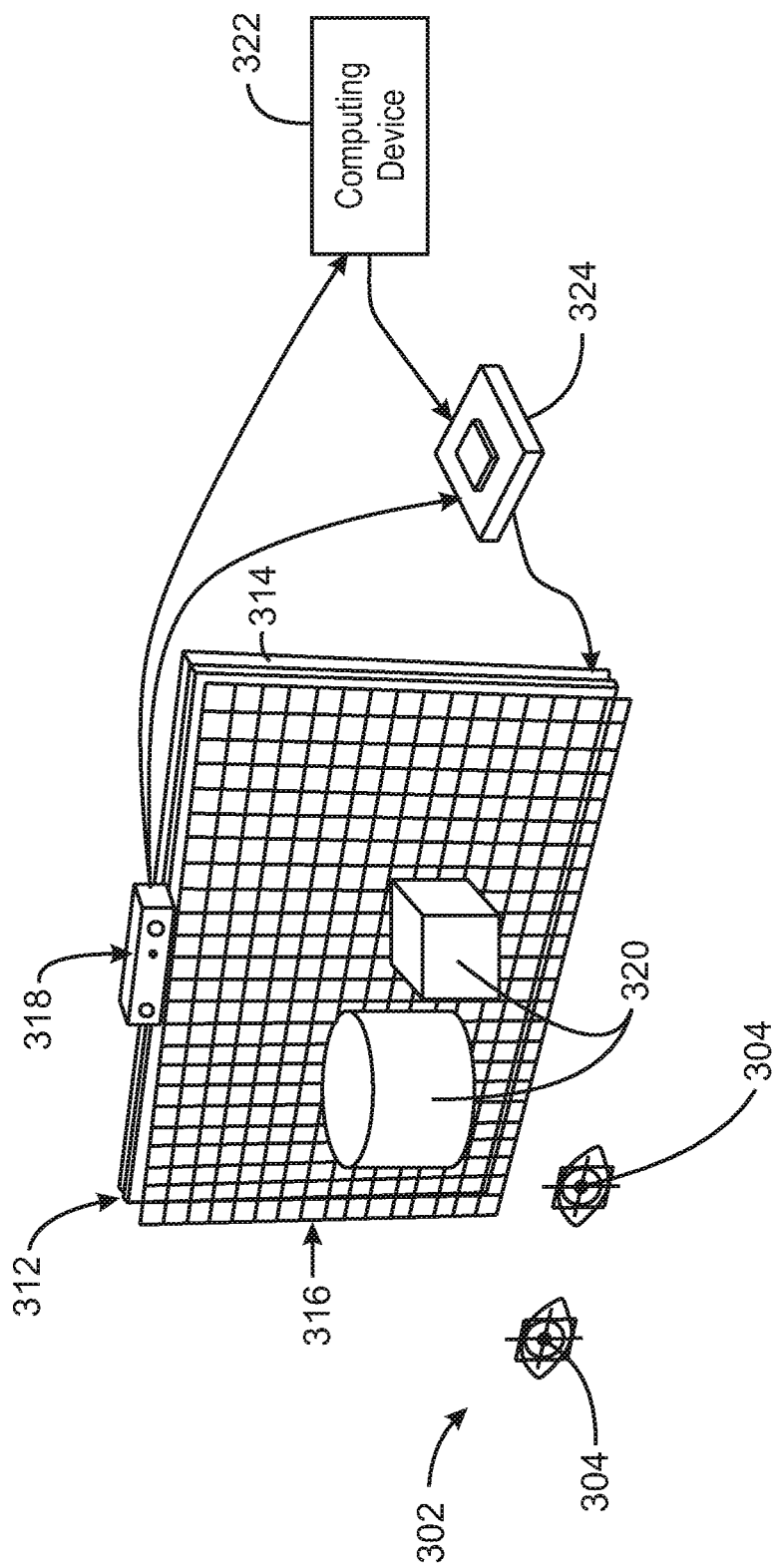
FIG. 3 illustrates a three dimensional (3D) display system.

FIG. 3 illustrates a three dimensional (3D) display system viewing environment 300. Environment 300 includes a user 302 (or viewer 302) of a display system. The user 302 has eyes including pupils 304. The display system viewing environment 300 includes a display 312 to be viewed by the user 302. In some embodiments, display 312 can be any type of display. In some embodiments, display 312 can be and/or can include a display screen and/or a display panel. In some embodiments, display 312 can be a display, a display screen, and/or a display panel with any pixel density. In some embodiments, display 312 can be a high pixel density display, a high pixel per inch or high PPI display, and/or a 4K display. In some embodiments, display 312 is a display having a pixel density higher than 250 pixels per inch. In some embodiments, display 312 is a display with as high of a pixel density as possible. In some embodiments, display 312 can be a mobile phone screen or a tablet screen, among others. In some embodiments, display 312 can be a liquid crystal display, an LCD display, a liquid crystal display screen, an LCD display screen, a liquid crystal display panel, and/or an LCD display panel, etc.

In some embodiments, a display backlight 314 may be provided behind the display 312. A micro lens array 316 (for example, a long focal length micro lens array and/or a long focal length micro lens array with an F number larger than 8) is provided in front of the display 312 between the display 312 and the eyes of the user 302. In some embodiments, micro lens array 316 is a long focal length micro lens array with high focal length. For example, in some embodiments, micro lens array 316 is a long focal length micro lens array with high focal length with an F number between 8 and 30. In some embodiments, micro lens array 316 has a high focal length, depending on viewing distance and eye box size (or viewing area size), with an F number varying between 8 and 30. A pupil tracking device 318 can be used to track the pupils 304 of the user 302, and send any result(s) to a computing device 322 and a light field processing unit 324. In some embodiments, for example, pupil tracking device 318 can be a real-time 3D pupil tracking system. Display 312 is used to display apparent locations of three dimensional objects 320, which can appear to user 302 to be at the display 312 (for example, at a plane of the display 312), in front of the display 312 (between the display 312 and the user 302), and/or behind the display 312.

Computing device 322 can include, for example, a graphics engine. The computing device 322 can render color images and/or color plus depth images (for example, can render any color components such as red, green, blue color components with or without depth, including for example, RGB or RBG-D images) according to the user's left and/or right pupil position, and send the rendered images to the light field processing unit 324. It is noted that in some embodiments, the images can be captured rather than rendered by computing device 322. In some embodiments, computing device 322 can capture or render stereo color plus depth images or light field images. The light field processing unit 324 can use pupil location information from the pupil tracking device 318 to convert the images received from the computing device 322 to stereo integral imagery using, for example, screen space ray tracing. Although screen space ray tracing is described herein, there are many different ways that the images may be converted. For example, rendering and post processing can be implemented in many different ways according to some embodiments. Many post processing techniques other than screen space ray tracing may be implemented according to some embodiments. The light field processing unit 324 can provide a light field image stream to the display screen 312 for display. In some embodiments, the backlight 314 (for example, a directional backlight) can steer light to corresponding pupil positions.

In some embodiments, the display system illustrated in FIG. 3 is a flexible light steering apparatus enabling a plurality of applications. Some embodiments implement single-viewer glasses-free three dimensional (3D) display that does not suffer from a convergence and accommodation conflict problem. In some embodiments, such display is compact, lightweight, and computationally and energy efficient relative to other displays such as, for example, brute force integral displays requiring dozens of gigapixels, a tensor display, which may be constrained by diffraction limitations making generation of sufficient density of view difficult in order to support accommodation, or bulky and impractical volumetric displays. In some embodiments, a directional backlight apparatus can be implemented for further benefits.

In some embodiments, the light steering properties of display system in FIG. 3 can be used to generate a correct light field for light rays that pass through the viewer's eye pupils. Generating light field directed to eye pupil location can allow using currently available commodity displays to create 3D images with light rays with high enough density to produce correct accommodation (or focus) and convergence cues.

In some embodiments, extremely high view densities can be achieved within a small eye box. The position of the small eye box can be aligned with the viewer's pupil position (for example, in response to a pupil tracking device such as pupil tracking device 318). The size of the small eye box can correspond to a typical human eye pupil size range. High view density can be achieved within a small eye box by placing a micro lens array (MLA) (for example, such as a long focal length micro lens array and/or micro lens array 316) in front of a display (for example, such as a high pixel density display and/or display 312), with a specific space in between the micro lens array and the display. The location of the eye box can be changed by shifting the image to be displayed on the display in response to the user tracking apparatus (for example, in response to a pupil tracking device such as pupil tracking device 318).

In some embodiments, a rendering process (for example, a rendering process implemented by computing device 322) is dependent on positions of the viewer's eyes (for example, dependent on positions of pupils 304 of user 302 tracked by pupil tracking device 318). In some embodiments, a capturing process (for example, a capturing process implemented by computing device 322) is dependent on positions of the viewer's eyes (for example, dependent on positions of pupils 304 of user 302 tracked by pupil tracking device 318). In some embodiments, a real time 3D tracking system (for example, pupil tracking device 318) can be used to track a viewer's pupil positions. The tracked pupil positions can be used to position capturing or rendering camera projection centers, and/or to digitally fine-tune eye box alignment.

Some embodiments relate to glasses-free 3D display using an integral imaging system, a 3D pupil tracking device, and a light-field processing unit that can deliver view density high enough for both left and right eyes of a user to overcome vergence-accommodation conflict or convergence-accommodation conflict (that is, convergence and accommodation conflict issues).

In some embodiments, a 3D pupil tracking system (such as pupil tracking device 318) tracks the pupil position of a viewer of a display, and sends the result to a computer (for example, such as computing device 322) and to a light field processing unit (for example, such as light field processing unit 324). The computing device captures and/or renders stereo images (for example, RGB and/or RGB-D images) according to the viewer's left and/or right pupil position. The light field processing unit uses pupil location information to convert the captured and/or rendered images to integral imagery using, for example, screen space ray tracing or any other view interpolation/synthesis technique. The image is then displayed on a high resolution display screen (for example, on display 312). At the same time, in some embodiments, a directional backlight (for example, such as backlight 314) steers light to corresponding pupil positions.

In some embodiments, a micro lens array (MLA) such as, for example, micro lens array 316, is placed in front of a high pixel density display module such as, for example, display 312. The display module and the micro lens array are spaced at the focal length of the micro lens array so that the rays from each pixel on the display pass through each micro lens on the micro lens array to form a collimated beam. Given the distance $d_z$ between the micro lens array and a user eye viewpoint in front of the micro lens array, a largest eye box occurs when the integral image pitch size $w_p$ is:

$$w_p = \frac{(d_z + f)p_l}{d_z p_p} \quad \text{EQUATION 1}$$

Where f is the focal length of the micro lens array, $p_l$ is the lens pitch of the micro lens array, and $p_p$ is the pixel pitch of the display. The eye box size $w_e$ can be calculated using the following:

$$w_e = \frac{d_z w_p p_p}{f} \quad \text{EQUATION 2}$$

When the viewer's eyes are perfectly located in the center of the eye box, they are able to observe a correct light field image. The rays from one pixel travel through the micro lens above that pixel, and also travel through neighboring micro lenses, forming replica eye boxes. When the viewer's eyes move out of the primary eye box, they will perceive a change in the light field image, and then enter a replica eye box.

In some embodiments illustrated in FIG. 3 and/or other embodiments, if you take a display with a certain image pattern displayed thereon, and place a lens array in front of the display, a user can see a full three dimensional image. This can be accomplished without the user wearing glasses, but merely looking at an area of the display and lens array. Depending on parameters of the display and the lens array, the size of the area that the user will see the 3D image may vary. The area where the user sees this 3D image may be referred to as a primary viewing zone (viewing zone as used herein is also referred to as an eye box). However, if the user moves outside a primary viewing zone (primary eye box), the user may also see the same or similar image in one or more secondary viewing zones (secondary eye boxes) that may repeat through various user viewing areas (eye boxes). There may be a number of secondary viewing zones, the number of secondary viewing zones depending on what the lens array may allow the user to see.

The resolution of the image (and/or 3D image quality), focus capability of the image, etc. can depend on an overall number of pixels beamed into a viewing zone. The smaller the viewing zone, the denser the light field. The wider the viewing zone, the sparser the light field. With sparser light fields, focus will degrade and 3D image quality will gradually become unacceptable In an implementation in which a lens array is placed in front of a display and the viewing zone is made small (for example, slightly larger than the size of a viewer's pupil), a very dense light field can be created. However, one pupil may see the image very well, but the other pupil may not see the image well at all (for example, the other pupil may see the same image or a corrupted image because it is between viewing zones). Additionally, if a user shifts their eye, their eye may leave one viewing zone and enter another viewing zone. If the viewing zone (eye box) is divided into two portions (for example, one portion for left eye and another portion for right eye), the left eye may see one repetition of a left portion of the viewing zone, and the right eye may see another repetition of a right portion of the viewing zone, then the user can view a stereo dense light field to view a 3D image with the user's two eyes. Another approach is to use one eye box per eye. However, if a regular backlight is used where light goes in multiple directions, all eye boxes (viewing zones) will be lit up with all repetitions of the viewing zones.

In some embodiments, a directional backlight can be used to emit light all in a certain direction. In this manner, directional backlight control can be used to light up only one viewing zone at a particular time, and repetitions of the viewing zone are not visible. For example, in some embodiments, a directional backlight emits light that is only directed toward one eye box (or viewing zone) in the area of an eye (and/or a pupil) of a user at one particular time. In some embodiments, pupil position is tracked, so the directional backlight can be controlled to send light to a particular tracked pupil at a particular time. In some embodiments, particular light emitting diodes (LEDs) of the backlight can be turned on and particular other LEDs of the backlight can be turned off to direct the controlled light emitted from the backlight to emit the light in the area of the viewer's eye (and/or pupil). In this manner, direction of the emitted light of the directional backlight can be changed according to eye movement (and/or pupil movement). Such directional backlight can be time multiplexed (also referred to herein as temporal multiplexed) between eyes of a viewer. In some embodiments, eyes (and/or pupils) of more than one user can be time multiplexed according to some embodiments. In some embodiments, for one particular user, the time multiplexing occurs at a fast frequency between eyes of a user (and/or pupils of a user) so that the image appears continuous to the user. For example, in some embodiments, the frequency can be 120 Hz for two eyes of a user (60 Hz for each eye). In some embodiments, the frequency is greater than 120 Hz (greater than 60 Hz for each eye).

In some embodiments, as described above, a high view density light field concentrated around one or more viewer's eye pupils is generated by a system using a long focal length micro lens array and a directional backlight. Such a system directs a light field into a small eye box (for example, in some embodiments, a small 10 mm by 10 mm eye box) with many views (for example, 20 by 20 views). In some embodiments, the eye box position is changed using a controllable directional backlight system. In this manner, at any particular moment the directional backlight can steer light into only one eye. Time multiplexing can be used to deliver required light field into both eyes, by changing the eye box position and displayed content at speeds exceeding a human eye flicker threshold.

Figure 4:
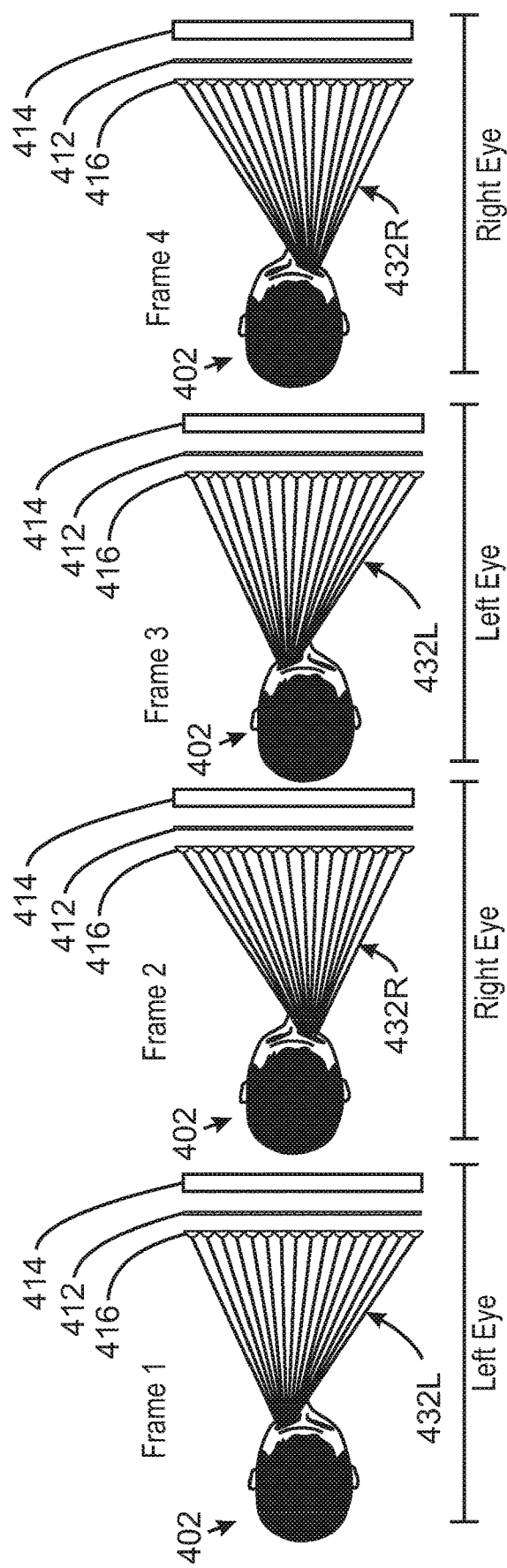
FIG. 4 illustrates temporal multiplexing.

FIG. 4 illustrates temporal multiplexing 400 (and/or time multiplexing 400). In some embodiments, FIG. 4 illustrates temporal multiplexing (and/or time multiplexing) with directional backlight control. FIG. 4 illustrates a user 402 with left and right eyes at a first timeframe (frame 1), a second timeframe (frame 2), a third timeframe (frame 3), and a fourth timeframe (frame 4), for example. In some embodiments, the timeframes are at a display rate faster than a human can recognize. In some examples, the timeframes are at a display rate of 120 Hz, for example.

FIG. 4 also illustrates a display 412 (for example, a display screen and/or display panel), a backlight 414 (for example, a directional backlight that can be directionally controlled), and a micro lens array 416. In some embodiments, display 412, backlight 414, and/or micro lens array 416 can be similar to and/or the same as display 312, backlight 314, and/or micro lens array 316 of FIG. 3. At frame 1, a high view density light field 432L is concentrated from backlight 414, display 412 and micro lens array 416 to a left eye (and/or a left pupil) of user 402. At frame 2, a high view density light field 432R is concentrated from backlight 414, display 412 and micro lens array 416 to a right eye (and/or a right pupil) of user 402. At frame 3, a high view density light field 432L is concentrated from backlight 414, display 412 and micro lens array 416 to the left eye (and/or the left pupil) of user 402. At frame 4, a high view density light field 432R is concentrated from backlight 414, display 412 and micro lens array 416 to the right eye (and/or the right pupil) of user 402. In this manner, display backlight 414 can be a directional backlight that can steer light alternating between the left and right eye of the user 402. This steering of light can be based, for example, on tracked eye location information (for example, tracked pupil location information). The tracked eye location information can be tracked eye location information from an eye tracking device such as, for example, pupil tacking device 318. In some embodiments, the display backlight 414 can steer light alternating between the left and right eye based on the tracked eye location information (and/or based on the tracked pupil location information) at a refresh rate that is higher than a human perceivable refresh rate (for example,
at 120 Hz). For example, the frames in FIG. 4 can be alternated at a refresh rate that is higher than a human perceivable refresh rate (such as a refresh rate of 120 Hz).

In some embodiments, a high view density light field (for example, high view density light field 432L and/or high view density light field 432R) can be concentrated around one or more viewer's eye pupils (for example, can be concentrated around eyes and/or eye pupils of viewer 402). The high view light field(s) can be generated by a system using a long focal length micro lens array (for example, micro lens array 416) and a directional backlight (for example, backlight 414). Such a system directs a light field (for example, light field 432L and/or light field 432R) into a small eye box (for example, in some embodiments, a small 10 mm by 10 mm eye box) with many views (for example, 20 by 20 views). In some embodiments, the eye box position is changed using a controllable directional backlight system (for example, including backlight 414). In this manner, at any particular moment the directional backlight can steer light into only one eye as illustrated, for example, in FIG. 4. Time multiplexing can be used to deliver required light field into both eyes, by changing the eye box position and displayed content at speeds exceeding a human eye flicker threshold (for example, at 120 Hz).

FIG. 4 has been described herein as time multiplexing between two eyes of a single user. However, in some embodiments, the time multiplexing illustrated in FIG. 4 or described herein is not limited to a single user. In some embodiments, time multiplexing of directional backlight can be implemented between more than one user (for example, between eyes of multiple users at a high enough refresh rate so that it is not apparent to any one user). Steering of directional backlight is not limited to one user. If display frequency is high enough, two or more users can be addressed simultaneously. For example, in some embodiments, in frame 1 a first eye of a first user receives directional backlight, in frame 2 a first eye of a second user receives directional backlight, in frame 3 a second eye of the first user receives directional backlight, and in frame 4 a second eye of the second user receives directional backlight. In other embodiments, other numbers of users and order of eyes receiving directional backlight at particular times can be implemented. In some embodiments, a sequential system is implemented. For example, some embodiments relate to a time multiplexed system in which light can be steered (for example, from a directional backlight) to individual positions or spaces near a display in a time multiplexed manner.

In some embodiments, with controlled backlight or without controlled backlight, the integral image displayed on the display can define the size and position of the eye box. By shifting the integral image displayed on the display, the eye box center can be shifted to align with either the left or the right pupil position.

Figure 5:
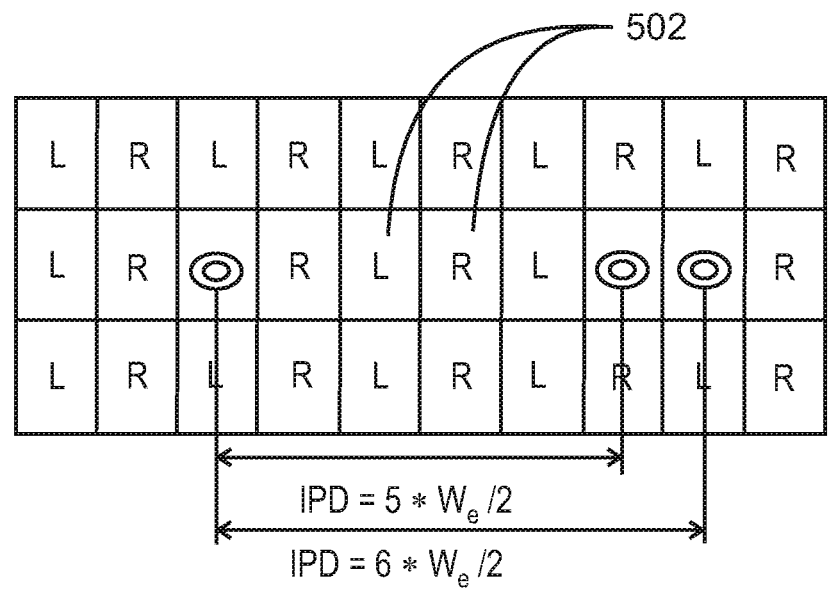
FIG. 5 illustrates an eye box.

FIG. 5 illustrates an eye box 500 that is subdivided into left (L) and right (R) parts. Eye box 500 includes left (L) and right (R) center eye box 502. The other eye boxes 500 other than center eye boxes 502 are repetitions of the center eye box 502. In some embodiments, eye box 500 is referred to as a divided eye box or a subdivided eye box, since it is divided into left (L) and right (R) portions. In some embodiments, eye box 500 can be used in conjunction with the system of FIG. 3 and/or of FIG. 4 in order to deliver a required light field into the eyes (for example, into the pupils) of one or more user.

Figures 6A, 6B:
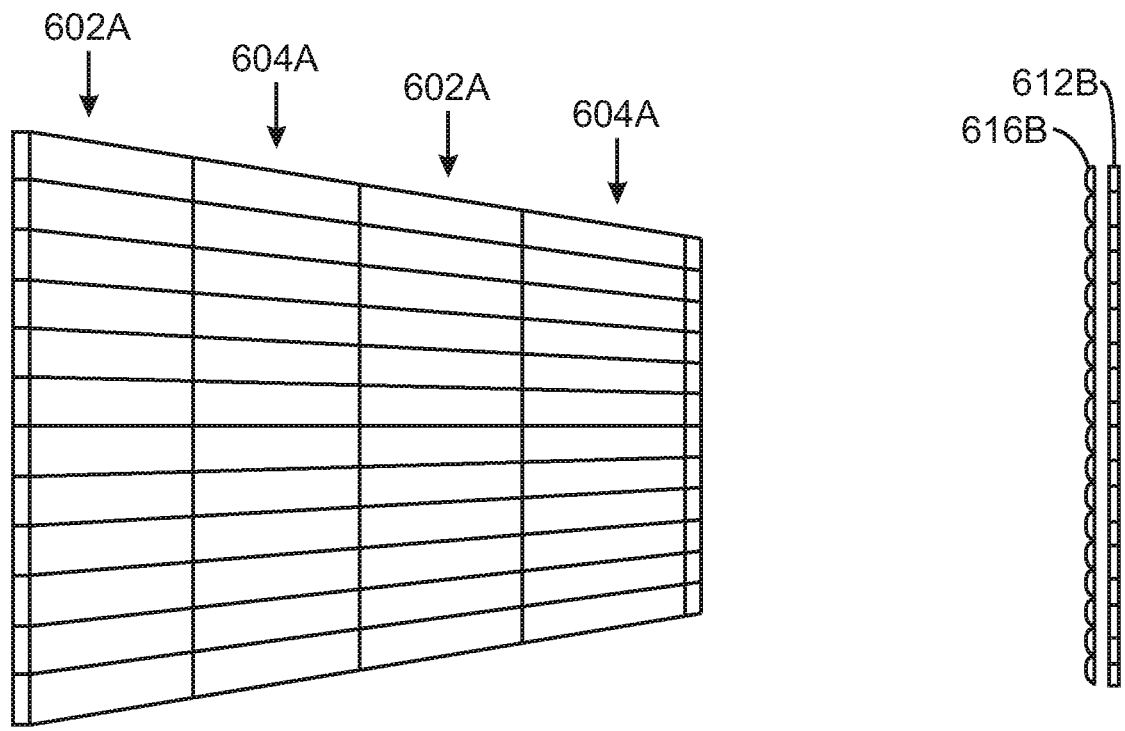
FIG. 6A illustrates an eye box.
FIG. 6B illustrates a display and a micro lens array.

FIG. 6A illustrates an eye box 600A from a front view. FIG. 6B illustrates a combination of a display 612B and a micro lens array 616B from a side view. In some embodiments, FIG. 6A illustrates good viewing area 602A and bad viewing areas 604A from a front view. In some embodiments, the side view 600B is a view from the side of front view 600A. In some embodiments, micro lens array 616B is a long focal length micro lens array. In some embodiments, display 612B is similar to and/or the same as display 312 of FIG. 3. In some embodiments, micro lens array 616B is similar to and/or the same as micro lens array 316 of FIG. 3. In some embodiments, eye box 600A can be used in conjunction with the system of FIG. 3 and/or of FIG. 4 in order to deliver a required light field into the eyes (for example, into the pupils) of one or more user.

In some embodiments, a high view density light field is generated in a small eye box using a long focal length micro lens array (for example, micro lens array 616B) and a divided eye box (for example, divided eye box 500 and/or divided eye box 600A).

In some embodiments, by dividing the eye box into left (L) and right (R) parts, the eye box can be arranged in a manner such that the left part of the eye box will cover the left eye, and a repetition of the right part of the eye box will cover the right eye. In this manner, the viewer will see a correct light field when at a correct viewing distance. In some embodiments, when a user's IPD is close to an integral multiple of the eye box size, the user will not be able to perceive a correct light field image since both eyes will see the same sub eye box (for example both eyes will see a right eye box or both eyes will see a left eye box). In some embodiments, this problem can be solved using micro lens array optics that can change focal lengths and spacing between micro lens array and screen, or by changing the viewing distance which determines the eye box size.

In some embodiments, a compact and controllable directional backlight system (for example such as backlight 314 of FIG. 3 and/or backlight 414 of FIG. 4) is used to overcome limitations of a divided eye box system. For example, a divided eye box system can produce a correct light field at certain fixed viewing distances when an IPD of a viewer (such as a horizontal IPD of a viewer) is an odd multiple of half the eye box width. As illustrated in FIG. 3, for example, when IPD=5*$W_e$/2, an L portion of the eye box lines up on the left eye of the viewer and an R portion of the eye box lines up on the right eye of the viewer. However, adjustment and/or use of a backlight may be necessary for a viewer with IPD=6*$W_e$/2, where an L portion of the eye box lines up on the left and an L portion of the eye box also lines up on the right, for example. Similar arrangements can occur with eye box 600A illustrated in FIG. 6A.

In some embodiments, the eye box shape is not required to be square. In some embodiments, however, the eye box is in a shape that can be tiled in a uniform grip. If the viewer's head is rotated with respect to the display screen, the viewer's left and right eyes may have different apparent heights relative to the display. Therefore, in some embodiments, left and right portions of the eye box can be moved up or down.

Figure 7:
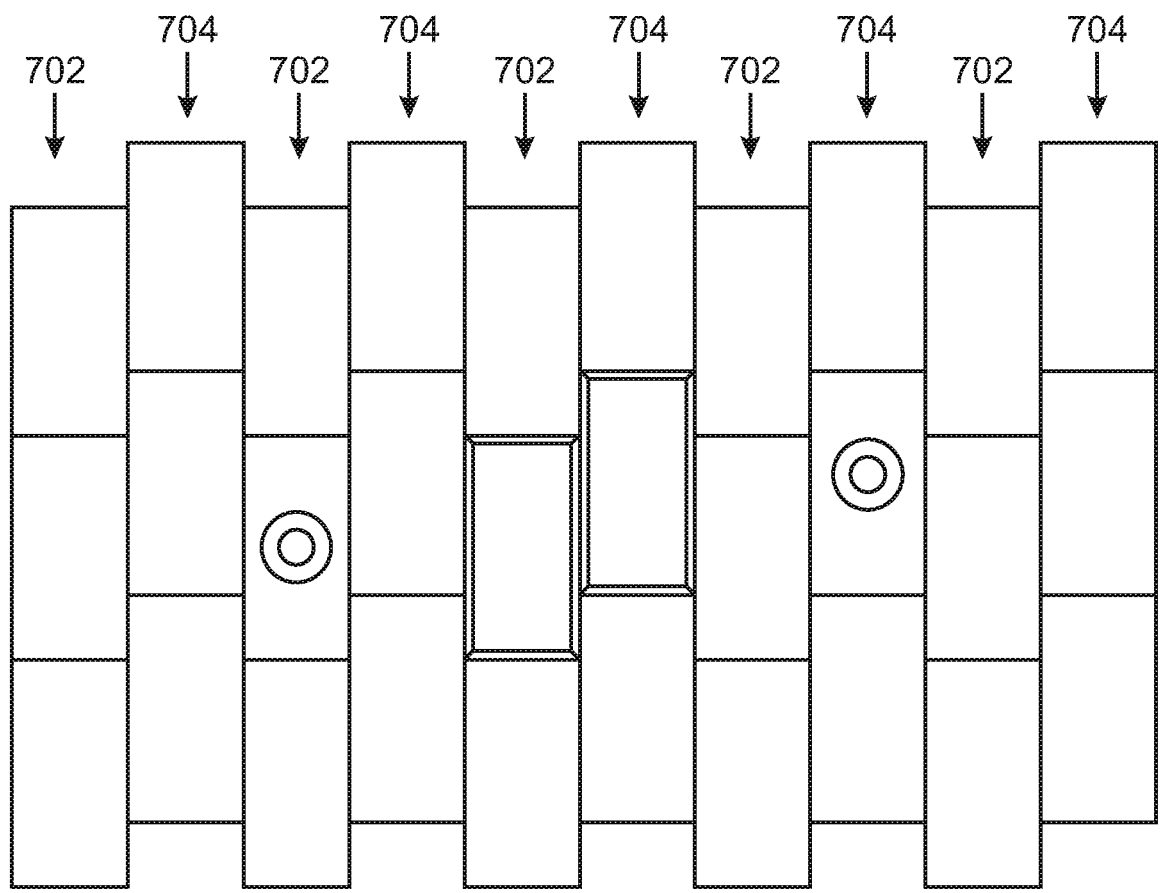
FIG. 7 illustrates an eye box.

FIG. 7 illustrates an eye box 700. In some embodiments, eye box 700 includes first eye box portions 702 (for example, left eye box parts 702) and second eye box portions 704 (for example, right eye box parts 704). As discussed above, if the viewer's head is rotated with respect to the display screen, for example, the viewer's left and right eyes may have different apparent heights relative to the display. Therefore, as illustrated in FIG. 7, portions 702 (for example, left portions 702) of the eye box 700 can be moved up or down, and/or portions 704 (for example, right portions 704) can be moved up or down so that portions 702 and 604 are at different heights. In some embodiments, eye box 700 can be used in conjunction with the system of FIG. 3 and/or of FIG. 4 in order to deliver a required light field into the eyes (for example, into the pupils) of one or more user.

Some portions of eye boxes have been illustrated herein as being rectangular in shape. For example, L and R eye box portions in FIGS. 5 and 7 are illustrated as being rectangular. However, in some embodiments, this may cause less than half of the light rays to be utilized since a rectangular shape does not match up well with the shape of a pupil. However, in some embodiments, a micro lens array can be designed with a different micro lens aspect ratio. For example, in some embodiments, a micro lens array design can be used with a micro lens aspect ratio equal to 2, resulting, for example, in an arrangement where each subdivided (or divided) eye box can be of a square shape.

In some embodiments, in order to generate an image to be displayed on the 3D display, capturing and/or rendering based on the pupil position of a user (viewer) can be performed by a computing device (for example, using graphics hardware) to generate intermedia data that encapsulate the geometry and texture information of the scene (such as, for example, RGB-D images). The data (such as RGB-D images) is then transmitted to a light field processing unit. The light field processing unit uses the real-time pupil position to calculate an optimal eye box size and an image offset needed to align the eye box center with pupil position. Then the light field processing unit can convert the image (such as the RGB-D image) to the final integral image. This can be implemented, for example, using screen-space ray tracing, or according to other techniques. In some embodiments, instead of using a graphic engine to generate the RGB-D images, captured RGB-D images can be transmitted to a light field processing unit to generate an image to be displayed on the 3D display.

Screen-space ray tracing is a very efficient post-processing technique for generating approximations of reflection, refraction, glossy reflection, ambient occlusion, and/or global illumination. This can be implemented at a much lower cost than some ray tracing techniques. In some embodiments, screen-space ray tracing is used to generate light field renderings from RGB-D data. In some embodiments, techniques other than screen-space ray tracing may be used (for example, according to some embodiments, any post processing technique may be used).

Figure 8:
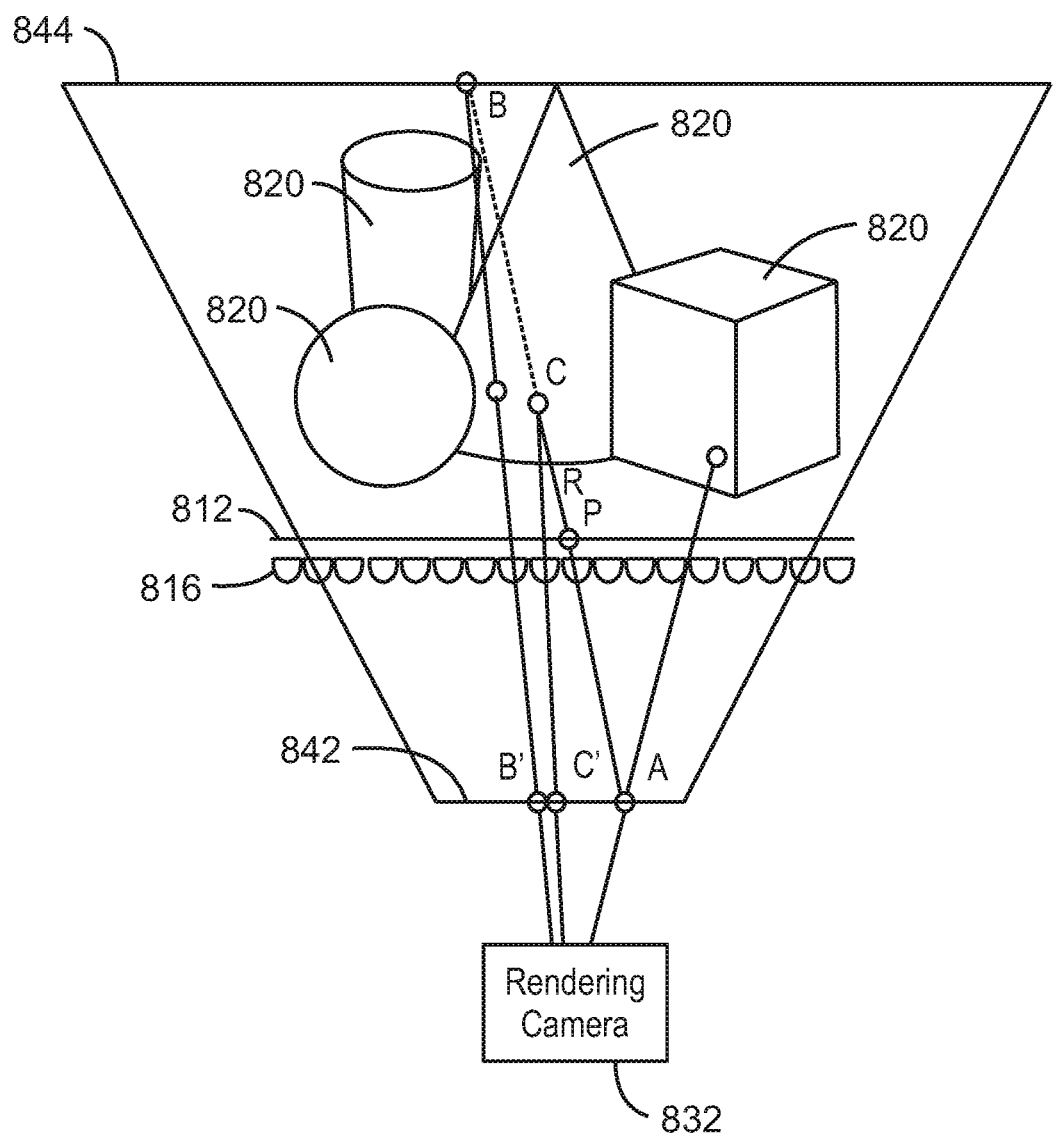
FIG. 8 illustrates a display image processing environment.

FIG. 8 illustrates display image processing in a three dimensional (3D) display environment 800. Environment 800 includes a display 812 (and/or a display screen 812, and/or a display panel 812) and a micro lens array 816. Display 812 can display three dimensional images to be viewed by a user or viewer. In some embodiments, display 812 can be the same as or similar to display 312, for example. In some embodiments, display 812 can be any type of display, any type of display screen, and/or any type of display panel. In some embodiments, display 812 can be a mobile phone screen or a tablet screen, among others. In some embodiments, a display backlight (not shown in FIG. 8) may be provided behind the display 812. Micro lens array 816 can be a long focal length micro lens array, and is provided in front of the display 812 between the display 812 and the eyes of a user. Display 812 is used to display apparent locations of three dimensional (3D) objects 820, which can appear to a user to be at the display 812 (for example, at a plane of the display 812, in front of the display 812 (between the display 812 and the user, and/or behind the display 812. In FIG. 8, the objects 820 are displayed at apparent locations behind the display 812 (above the display 812 in FIG. 8). A capturing and/or rendering camera 832 is used to capture and/or render images through a near clip plane 842, micro lens array 816, display 812, and a far clip plane 844.

In some embodiments, a scene including objects 820 has been captured and/or rendered to a canvas at the near clip plane 842. Since the scene has been captured and/or rendered, color and depth at any point is available. For a pixel P on the display 812, the location of the pixel P and the optical center of the lenslet (or lens within the micro lens array) in front of the pixel P defines a ray R in space. The color of pixel P can be defined by the color of the intersecting point of ray R with the three dimensional (3D) scene (for example, at point C). A simple one dimensional (1D) search on the canvas of the near clip plane 842 can be used to find the intersecting point C using the following steps:

1. Compute the intersection of ray R with both the near clip plane 842 and the far clip plane 844. In the case of FIG. 8, these two points are point A at the near clip plane 842 and point B at the far clip plane 844.

2. Project point B onto the near clip plane 842 to get point B'. This projection can be performed by drawing a line between point B and the viewpoint of the capturing and/or rendering camera 832.

3. Interpolate from point A to point B'. This interpolation can occur in the two dimensional (2D) plane represented by near clip plane 842. Each pixel in the sequence can be efficiently computed using the Bresenham interpolation algorithm (or Bresenham's line algorithm, or digital differential analyzer algorithm, or DDA line algorithm), for example. In some embodiments, Bresenham's line algorithm (or other algorithm) can be used to determine points of an n-dimensional raster that should be selected in order to form a close approximation to a straight line between two points. In some embodiments, any of the Bresenham family of algorithms extending or modifying Bresenham's original algorithm may be used. See, for example, https://en.wikipedia.org/wiki/Bresenham%27s_line_algorithm.

4. For each point C' generated by the interpolation, the depth is read from a precomputed two dimensional (2D) canvas. The depth of the corresponding 3D point C on ray R is also computed. Since the 2D line segment from point A to point B' is a 2D projection of the 3D line from point A to point B, for any point C' a corresponding point C can be directly computed. Points C' are repeatedly generated and tested until the depth of the 3D point C is larger than the depth read from the precomputed 2D canvas, or the 3D point is outside the frustrum (that is, past the far clipping plane 844). That test can be used to determine whether the correct point C in the virtual scene has been found, or if there is no virtual object associated with that pixel. If there is no virtual object associated with that pixel, then the color of C can be set to a background color.

5. Set the color of the pixel P to the color of pixel C and stop the process.

In some embodiments, techniques described herein can be used to build a computational display that is practical for users. In some embodiments, computational displays can be used to display 3D content without causing eyestrain or requiring 3D glasses. In some embodiments, displays described and/or illustrated herein can be included in all form factors (for example, all displays including wearables, phones, tablets, laptops, desktops, and/or far-eye displays).

In some embodiments, the image to be displayed on the 3D display can be rendered directly with ray tracing, and/or with any other techniques. With tracked pupil location and viewing distance, the eye box size and position can be computed using Equation 1 and Equation 2. In some embodiments, each single pixel on the display will only be visible from one micro lens in any given eye box. Tracing the ray that passes though the pixel center and the mirco lens optical center in the virtual scene will return the pixel color for that particular pixel in the final image.

In some embodiments, the image to be displayed on the 3D display can be rendered directly with conventional rasterization using multi frustums. The multi frustums for the rendering cameras are defined by the eye box size, eye box position, and screen size. The number of pixels visible from one single lens defines the number of rendering cameras needed. In case the number of pixels visible from one single micro lens is not an integral number, the rendering camera number can be up sampled to a larger integer number. For example, the number of pixels under one micro lens is 10.5*10.5, but it is impossible to have 10.5*10.5 rendering cameras. As an alternative, 15*15 rending cameras can be used. The frustums are defined by the projection center of the frustums, which are the uniform 15*15 2D grid sample of the eye box, and the four corners of the display. The resolution need for each camera is defined by the number of micro lens on the display. The final integral image can be generated by interleaving the 15*15 rendered image in reverse direction and then down sample by the inverse of the up sample ratio (10.5/15). Depending on the location of the pupil, the integral image will need to be shifted.

In some embodiments, directional backlight based time multiplexing is implemented. In some embodiments, an eye box (also referred to herein as a viewing area) is split (for example, between left and right eyes). In some embodiments, various content generation approaches may be implemented. In some embodiments, any rendering implementation may be used. In some embodiments, screen space ray tracing may be used (for example, in some embodiments, screen space ray tracing on color plus depth images such as RGB-D images). In some embodiments, ray tracing may be implemented. In some embodiments, captured data synthesis may be implemented (for example, captured image data synthesis such as captured RGB image data or captured RGB-D image data).

Figure 9:
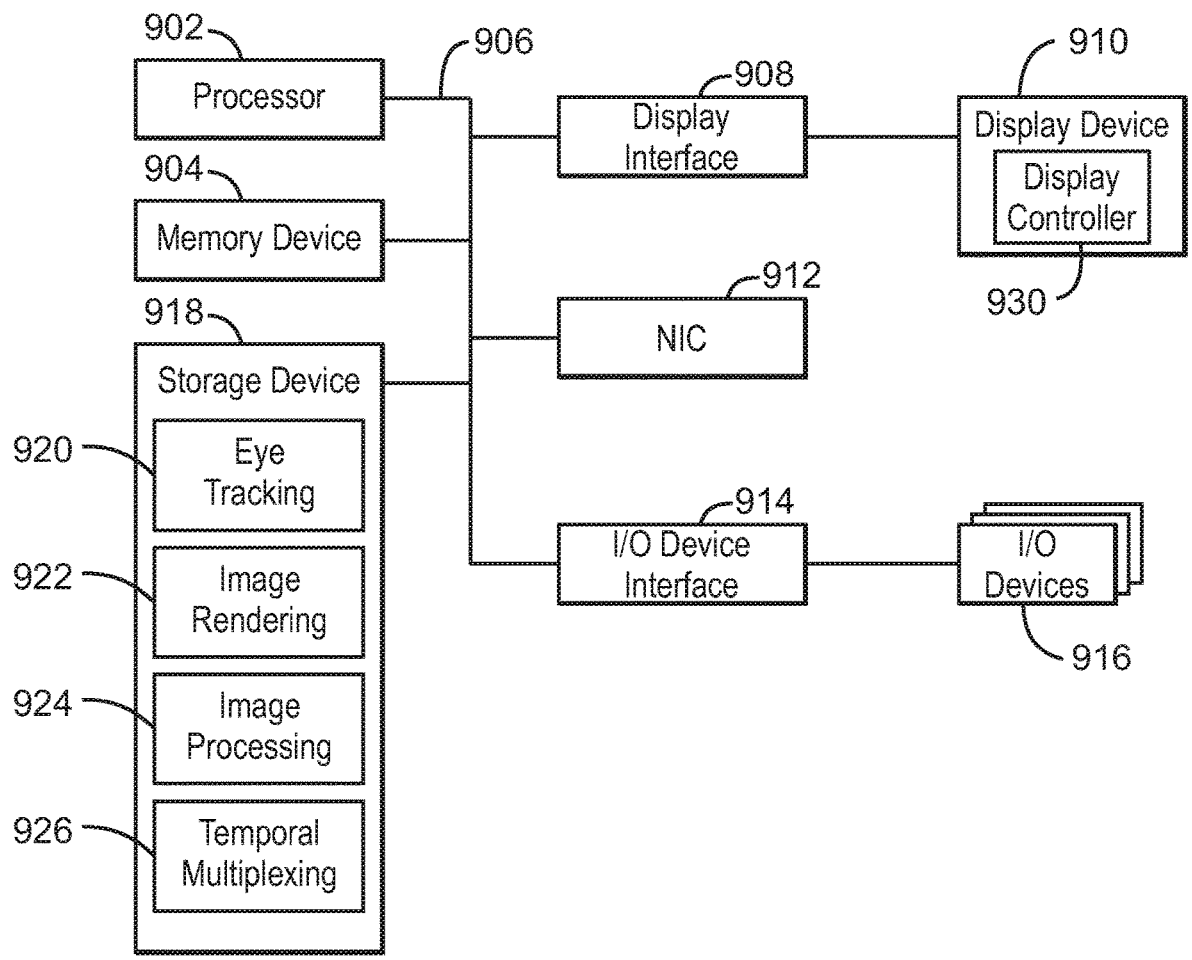
FIG. 9 illustrates a computing device.

FIG. 9 is a block diagram of an example of a computing device 900. In some embodiments, computing device 900 can be included in a device that can implement viewing mode adjustment. In some embodiments, computing device 900 can implement pupil (or eye) tracking, image rendering, image processing, etc. as described in this specification and/or illustrated in the drawings. In some embodiments, computing device 900 can be included as a portion or all of a pupil tracking device (for example, pupil tracking device 318). In some embodiments, computing device 900 can be included as a portion or all of a computing device implementing image rendering (for example, computing device 322). In some embodiments, computing device 900 can be included as a portion or all of a light field processing unit (for example, light field processing unit 324). In some embodiments, the computing device 900 may be included in, for example, a display system, among others. The computing device 900 may include a processor 902 that is adapted to execute stored instructions, as well as a memory device 904 (and/or storage device 904) that stores instructions that are executable by the processor 902. The processor 902 can be a single core processor, a multi-core processor, a computing cluster, or any number of other configurations. The memory device 904 can be a memory device and/or a storage device, and can include volatile storage, non-volatile storage, random access memory, read only memory, flash memory, and/or any other suitable memory and/or storage systems. The instructions that are executed by the processor 902 may also be used to implement viewing mode adjustment as described in this specification.

The processor 902 may also be linked through a system interconnect 906 (e.g., PCI®, PCI-Express®, NuBus, etc.) to a display interface 908 adapted to connect the computing device 900 to a display device 910. The display device 910 may include a display screen that is a built-in component of the computing device 900. The display device 910 may include a display, a micro lens array, and/or a display backlight, for example.

In some embodiments, the display interface 908 can include any suitable graphics processing unit, transmitter, port, physical interconnect, and the like. In some examples, the display interface 908 can implement any suitable protocol for transmitting data to the display device 910. For example, the display interface 908 can transmit data using a high-definition multimedia interface (HDMI) protocol, a DisplayPort protocol, or some other protocol or communication link, and the like In some embodiments, display device 910 includes a display controller. In some embodiments, a display controller can provide control signals within and/or to the display device. In some embodiments, a display controller can be included in the display interface 908 (and/or instead of the display interface 908). In some embodiments, a display controller can be coupled between the display interface 908 and the display device 910. In some embodiments, the display controller can be coupled between the display interface 908 and the interconnect 906. In some embodiments, the display controller can be included in the processor 902. In some embodiments, the display controller can implement control of a display and/or a backlight of display device 910 according to any of the examples illustrated in any of the drawings and/or as described anywhere herein.

In some embodiments, any of the techniques described in this specification can be implemented entirely or partially within the display device 910. In some embodiments, any of the techniques described in this specification can be implemented entirely or partially within a display controller. In some embodiments, any of the techniques described in this specification can be implemented entirely or partially within the processor 902.

In addition, a network interface controller (also referred to herein as a NIC) 912 may be adapted to connect the computing device 900 through the system interconnect 906 to a network (not depicted). The network (not depicted) may be a wireless network, a wired network, cellular network, a radio network, a wide area network (WAN), a local area network (LAN), a global position satellite (GPS) network, and/or the Internet, among others.

The processor 902 may be connected through system interconnect 906 to an I/O interface 914. I/O interface 914 can be used to couple interconnect 906 with one or more I/O devices 916. One or more input/output (I/O) device interfaces 914 may be adapted to connect the computing host device 900 to one or more I/O devices 916. The I/O devices 916 may include, for example, a keyboard and/or a pointing device, where the pointing device may include a touchpad or a touchscreen, among others. The I/O devices 916 may be built-in components of the computing device 900, or may be devices that are externally connected to the computing device 900.

In some embodiments, the processor 902 may also be linked through the system interconnect 906 to a storage device 918 that can include a hard drive, a solid state drive (SSD), a magnetic drive, an optical drive, a portable drive, a flash drive, a Universal Serial Bus (USB) flash drive, an array of drives, and/or any other type of storage, including combinations thereof. In some embodiments, the storage device 918 can include any suitable applications. In some embodiments, the storage device 918 can include eye tracking (and/or pupil tracking) 920, image rendering 922, image processing 924, and/or temporal multiplexing 926 (such as, for example, temporal multiplexing with directional backlight). In some embodiments, eye tracking (and/or pupil tracking) 920, image rendering 922, image processing 924, and/or temporal multiplexing 926 can include instructions that can be executed (for example, can be executed by processor 902) to perform functionality as described and/or illustrated anywhere in this specification.

It is to be understood that the block diagram of FIG. 9 is not intended to indicate that the computing device 900 is to include all of the components shown in FIG. 9. Rather, the computing device 900 can include fewer and/or additional components not illustrated in FIG. 9 (e.g., additional memory components, embedded controllers, additional modules, additional network interfaces, etc.). Furthermore, any of the functionalities of eye tracking 920, image rendering 922, image processing 924, and/or temporal multiplexing 926 may be partially, or entirely, implemented in hardware and/or in the processor 902. For example, the functionality may be implemented with an application specific integrated circuit, logic implemented in an embedded controller, or in logic implemented in the processor 902, among others. In some embodiments, the functionalities of the eye tracking 920, image rendering 922, image processing 924, and/or temporal multiplexing 926 can be implemented with logic, wherein the logic, as referred to herein, can include any suitable hardware (e.g., a processor, among others), software (e.g., an application, among others), firmware, or any suitable combination of hardware, software, and firmware.

Figure 10:
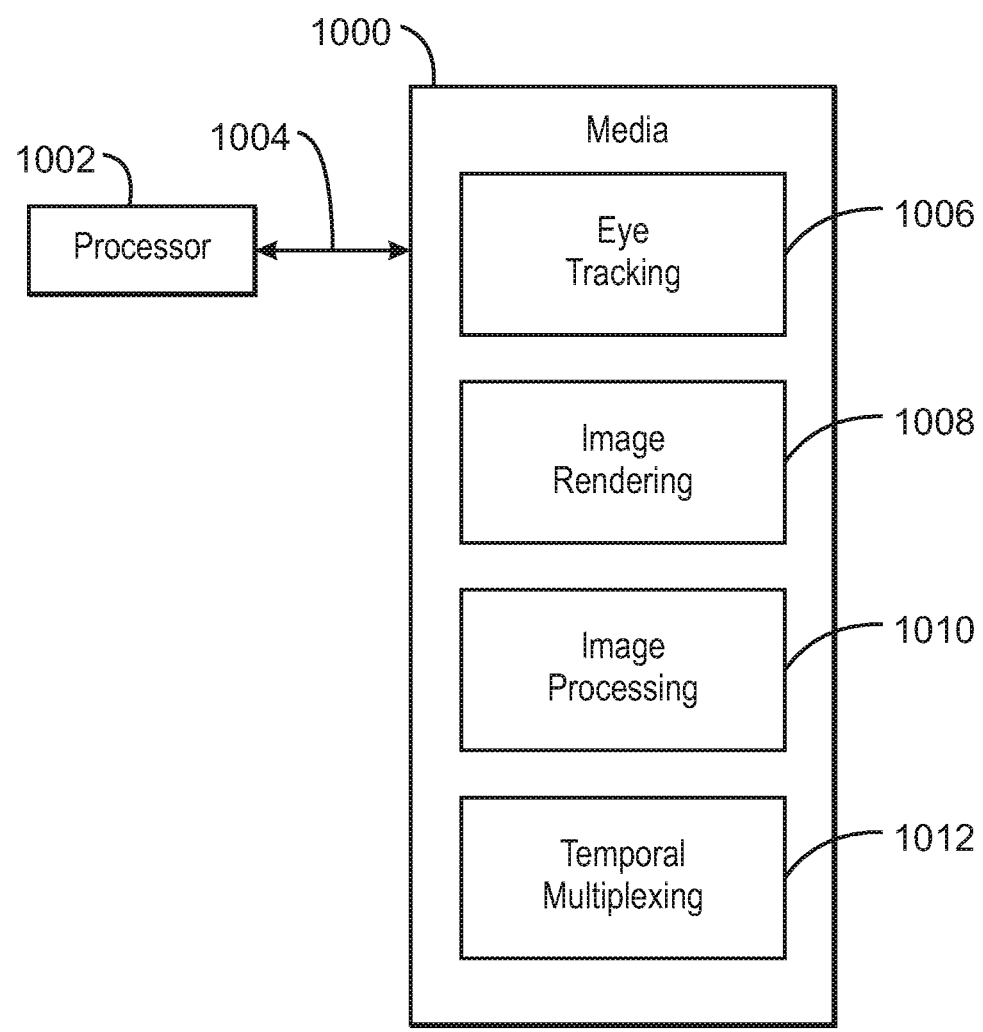
FIG. 10 illustrates one or more processor and one or more tangible, non-transitory, computer-readable media.

FIG. 10 is a block diagram of an example of one or more processor and one or more tangible, non-transitory computer readable media. The one or more tangible, non-transitory, computer-readable media 1000 may be accessed by a processor 1002 over a computer interconnect 1004. Furthermore, the one or more tangible, non-transitory, computer-readable media 1000 may include code to direct the processor 1002 to perform operations as described herein. For example, in some embodiments, computer-readable media 1000 may include code to direct the processor to perform one or more of eye tracking 1006 (and/or pupil tracking 1006), image rendering 1008, image processing 1010, and/or temporal multiplexing (for example, temporal multiplexing with backlight control) according to some embodiments. In some embodiments, processor 1002 is one or more processors. In some embodiments, processor 1002 can perform similarly to (and/or the same as) processor 902 of FIG. 9, and/or can perform some or all of the same functions as can be performed by processor 902.

Various components discussed in this specification may be implemented using software components. These software components may be stored on the one or more tangible, non-transitory, computer-readable media 1000, as indicated in FIG. 10. For example, software components including, for example, computer readable instructions implementing eye tracking 1006, image rendering 1008, image processing 1010, and/or temporal multiplexing 1012 (for example, temporal multiplexing with backlight control) may be included in one or more computer readable media 1000 according to some embodiments. Eye tracking 1006, image rendering 1008, image processing 1010, and/or temporal multiplexing 1012 may be adapted to direct the processor 1002 to perform one or more of any of the operations described in this specification and/or in reference to the drawings.

It is to be understood that any suitable number of the software components shown in FIG. 10 may be included within the one or more tangible, non-transitory computer-readable media 1000. Furthermore, any number of additional software components not shown in FIG. 10 may be included within the one or more tangible, non-transitory, computer-readable media 1000, depending on the specific application.

Embodiments have been described herein as relating to RGB and/or RGB-D images. However, embodiments can relate more generally to any color images including RGB images or other color images, and/or can relate to color plus depth images including RGB-D images or other color plus depth images.

Reference in the specification to "one embodiment" or "an embodiment" or "some embodiments" of the disclosed subject matter means that a particular feature, structure, or characteristic described in connection with the embodiment is included in at least one embodiment of the disclosed subject matter. Thus, the phrase "in one embodiment" or "in some embodiments" may appear in various places throughout the specification, but the phrase may not necessarily refer to the same embodiment or embodiments.

Example 1 is a three dimensional display apparatus. The three dimensional display apparatus includes a display (for example, a display, a display screen, and/or a display panel) and a micro lens array. The three dimensional display apparatus also includes an eye tracker to track a plurality of eyes, and to provide eye location information corresponding to the tracking. A rendering processor it to render or capture color plus depth images or light field images. A light field processor is to use the eye location information to convert the rendered or captured color plus depth images or light field images to display images to be provided to the display.

Example 2 includes the display of example 1, including or excluding optional features. In this example, the rendering processor is to render light field images based on the eye location information, and the light field processor is to synthesize rendered or captured color, light field or multi view images to the required light field image for the display.

Example 3 includes the display of any of examples 1 or 2, including or excluding optional features. In this example, a display backlight is to steer backlight based on the eye location information.

Example 4 includes the display of any of examples 1-3, including or excluding optional features. In this example, the display is a high pixel density display having a pixel density higher than 250 pixels per inch.

Example 5 includes the display of any of examples 1-4, including or excluding optional features. In this example, the micro lens array is a long focal length micro lens array with an F number larger than 8.

Example 6 includes the display of any of examples 1-5, including or excluding optional features. In this example, the eye tracker is a pupil tracker to track one or more pupils, and the eye location information is pupil location information.

Example 7 includes the display of any of examples 1-6, including or excluding optional features. In this example, the eye tracker is a three dimensional eye tracker and the eye location information is three dimensional eye location information.

Example 8 includes the display of any of examples 1-7, including or excluding optional features. In this example, the rendering processor is a graphics engine.

Example 9 includes the display of any of examples 1-8, including or excluding optional features. In this example, the light field processor is to convert the rendered or captured color plus depth images or light field images to stereo integral images to be provided to the display.

Example 10 includes the display of any of examples 1-9, including or excluding optional features. In this example, the rendering processor is to render each color plus depth image or light field image according to the tracked location of one or more of the eyes.

Example 11 includes the display of any of examples 1-10, including or excluding optional features. In this example, the rendering processor is to render the color plus depth images or light field images based on the eye location information.

Example 12 includes the display of any of examples 1-11, including or excluding optional features. In this example, the light field processor is to use the eye location information to calculate an optimal eye box size and to offset displayed images to align a center of an eye box with eye location of the person.

Example 13 includes the display of any of examples 1-12, including or excluding optional features. In this example, the light field processor is to convert the rendered or captured color plus depth images or light field images to display images using one or more post-processing technique.

Example 14 includes the display of example 13, including or excluding optional features. In this example, the one or more post processing technique includes screen-space ray tracing.

Example 15 includes the display of any of examples 1-14, including or excluding optional features. In this example, the light field processor is to provide display images to the display.

Example 16 includes the display of any of examples 1-15, including or excluding optional features. In this example, a display backlight is to steer light alternating between a left and right eye based on the tracked eye location information at a refresh rate that is higher than a human perceivable refresh rate.

Example 17 is a three dimensional display light field image method. The method includes tracking one or more eyes viewing a micro lens array and a display screen to provide eye location information, rendering or capturing color plus depth images or light field images, and using the eye location information to convert the rendered or captured color plus depth images or light field images to display images to be provided to the display.

Example 18 includes the method of example 17, including or excluding optional features. In this example, light field images are rendered based on the eye location information, captured color, light field or multi view images are synthesized to the required light field image for the display.

Example 19 includes the method of any of examples 17 or 18, including or excluding optional features. In this example, backlight is steered based on the eye location information.

Example 20 includes the method of any of examples 17-19, including or excluding optional features. In this example, the display is a high pixel density display having a pixel density higher than 250 pixels per inch.

Example 21 includes the method of any of examples 17-20, including or excluding optional features. In this example, the micro lens array is a long focal length micro lens array with an F number greater than 8.

Example 22 includes the method of any of examples 17-21, including or excluding optional features. In this example, one or more pupils viewing the micro lens array and the display screen are tracked to provide pupil location information, and the eye location information is pupil location information.

Example 23 includes the method of any of examples 17-22, including or excluding optional features. In this example, the one or more eyes are tracked in three dimensions, and the eye location information is three dimensional eye location information.

Example 24 includes the method of any of examples 17-23, including or excluding optional features. In this example, the rendering includes graphics rendering.

Example 25 includes the method of any of examples 17-24, including or excluding optional features. In this example, the rendered or captured color plus depth images or light field images are converted to integral images to be provided to the display.

Example 26 includes the method of any of examples 17-25, including or excluding optional features. In this example, each color plus depth image is rendered according to the tracked location of one of the eyes.

Example 27 includes the method of any of examples 17-26, including or excluding optional features. In this example, the color plus depth images are rendered based on the eye location information.

Example 28 includes the method of any of examples 17-27, including or excluding optional features. In this example, the eye location information is used to calculate an optimal eye box size and to offset displayed images to align a center of an eye box with eye location.

Example 29 includes the method of any of examples 17-28, including or excluding optional features. In this example, the rendered color plus depth images or captured color plus depth images are converted to display images using one or more post processing technique.

Example 30 includes the method of example 29, including or excluding optional features. In this example, the one or more post processing technique includes screen-space ray tracing.

Example 31 includes the method of any of examples 17-30, including or excluding optional features. In this example, the display images are provided to the display.

Example 32 includes the method of any of examples 17-31, including or excluding optional features. In this example, light alternating between a left and right eye is steered based on the tracked eye location information at a refresh rate that is higher than a human perceivable refresh rate.

Example 33 is one or more tangible, non-transitory machine readable media. The media include a plurality of instructions that, in response to being executed on at least one processor, cause the at least one processor to track one or more eyes viewing a micro lens array and a display screen to provide eye location information, render or capture color plus depth images or light field images, and use the eye location information to convert the rendered or captured color plus depth images or light field images to display images to be provided to the display.

Example 34 includes the one or more tangible, non-transitory machine readable media of example 33, including or excluding optional features. In this example, the one or more tangible, non-transitory machine readable media include a plurality of instructions that, in response to being executed on at least one processor, cause the at least one processor to render light field images based on the eye location information, and to synthesize captured color, light field or multi view images to the required light field image for the display.

Example 35 includes the one or more tangible, non-transitory machine readable media of any of examples 33 or 34, including or excluding optional features. In this example, the one or more tangible, non-transitory machine readable media include a plurality of instructions that, in response to being executed on at least one processor, cause the at least one processor to steer backlight based on the eye location information.

Example 36 includes the one or more tangible, non-transitory machine readable media of any of examples 33-35, including or excluding optional features. In this example, the display is a high pixel density display having a pixel density higher than 250 pixels per inch.

Example 37 includes the one or more tangible, non-transitory machine readable media of any of examples 33-36, including or excluding optional features. In this example, the micro lens array is a long focal length micro lens array with an F number greater than 8.

Example 38 includes the one or more tangible, non-transitory machine readable media of any of examples 33-37, including or excluding optional features. In this example, the one or more tangible, non-transitory machine readable media include a plurality of instructions that, in response to being executed on at least one processor, cause the at least one processor to track one or more pupils viewing the micro lens array and the display screen to provide pupil location information, where the eye location information is pupil location information.

Example 39 includes the one or more tangible, non-transitory machine readable media of any of examples 33-38, including or excluding optional features. In this example, the one or more tangible, non-transitory machine readable media include a plurality of instructions that, in response to being executed on at least one processor, cause the at least one processor to track the one or more eyes in three dimensions, wherein the eye location information is three dimensional eye location information.

Example 40 includes the one or more tangible, non-transitory machine readable media of any of examples 33-39, including or excluding optional features. In this example, the rendering includes graphics rendering.

Example 41 includes the one or more tangible, non-transitory machine readable media of any of examples 33-40, including or excluding optional features. In this example, the one or more tangible, non-transitory machine readable media include a plurality of instructions that, in response to being executed on at least one processor, cause the at least one processor to convert the rendered or captured color plus depth images or light field images to integral images to be provided to the display.

Example 42 includes the one or more tangible, non-transitory machine readable media of any of examples 33-41, including or excluding optional features. In this example, the one or more tangible, non-transitory machine readable media include a plurality of instructions that, in response to being executed on at least one processor, cause the at least one processor to render each color plus depth image according to the tracked location of one of the eyes.

Example 43 includes the one or more tangible, non-transitory machine readable media of any of examples 33-42, including or excluding optional features. In this example, the one or more tangible, non-transitory machine readable media include a plurality of instructions that, in response to being executed on at least one processor, cause the at least one processor to render the color plus depth images based on the eye location information.

Example 44 includes the one or more tangible, non-transitory machine readable media of any of examples 33-43, including or excluding optional features. In this example, the one or more tangible, non-transitory machine readable media include a plurality of instructions that, in response to being executed on at least one processor, cause the at least one processor to calculate an optimal eye box size and to offset displayed images to align a center of an eye box with eye location.

Example 45 includes the one or more tangible, non-transitory machine readable media of any of examples 33-44, including or excluding optional features. In this example, the one or more tangible, non-transitory machine readable media include a plurality of instructions that, in response to being executed on at least one processor, cause the at least one processor to convert the rendered color plus depth images or captured color plus depth images to display images using one or more post processing technique.

Example 46 includes the one or more tangible, non-transitory machine readable media of any of example 45, including or excluding optional features. In this example, the one or more post processing technique includes screen-space ray tracing.

Example 47 includes the one or more tangible, non-transitory machine readable media of any of examples 33-46, including or excluding optional features. In this example, the one or more tangible, non-transitory machine readable media include a plurality of instructions that, in response to being executed on at least one processor, cause the at least one processor to provide the display images to the display.

Example 48 includes the one or more tangible, non-transitory machine readable media of any of examples 33-47, including or excluding optional features. In this example, the one or more tangible, non-transitory machine readable media include a plurality of instructions that, in response to being executed on at least one processor, cause the at least one processor to steer light alternating between a left and right eye based on the tracked eye location information at a refresh rate that is higher than a human perceivable refresh rate.

Example 49 is a three dimensional display apparatus including a display, a micro lens array, means for tracking a plurality of eyes, means for providing eye location information corresponding to the tracking, means for rendering or capturing color plus depth images or light field images, and means for using the eye location information to convert the rendered or captured color plus depth images or light field images to display images to be provided to the display.

Example 50 includes the three dimensional display apparatus of example 49, including or excluding optional features. In this example, the apparatus includes means for rendering light field images based on the eye location information, and means for synthesizing rendered or captured color, light field or multi view images to the required light field image for the display.

Example 51 includes the three dimensional display apparatus of any of examples 49 or 50, including or excluding optional features. In this example, the apparatus includes means for steering backlight based on the eye location information.

Example 52 includes the three dimensional display apparatus of any of examples 49-51, including or excluding optional features. In this example, the display is a high pixel density display having a pixel density higher than 250 pixels per inch.

Example 53 includes the three dimensional display apparatus of any of examples 49-52, including or excluding optional features. In this example, the micro lens array is a long focal length micro lens array with an F number larger than 8.

Example 54 includes the three dimensional display apparatus of any of examples 49-53, including or excluding optional features. In this example, the apparatus includes means for tracking one or more pupils, wherein the eye location information is pupil location information.

Example 55 includes the three dimensional display apparatus of any of examples 49-54, including or excluding optional features. In this example, the apparatus includes means for tracking one or more eyes in three dimensions, where the eye location information is three dimensional eye location information.

Example 56 includes the three dimensional display apparatus of any of examples 49-55, including or excluding optional features. In this example, the means for rendering comprises a means for rendering graphics.

Example 57 includes the three dimensional display apparatus of any of examples 49-56, including or excluding optional features. In this example, the apparatus includes means for converting the rendered or captured color plus depth images or light field images to stereo integral images to be provided to the display.

Example 58 includes the three dimensional display apparatus of any of examples 49-57, including or excluding optional features. In this example, the apparatus includes means for rendering each color plus depth image or light field image according to the tracked location of one of the eyes.

Example 59 includes the three dimensional display apparatus of any of examples 49-58, including or excluding optional features. In this example, the apparatus includes means for rendering the color plus depth images or light field images based on the eye location information.

Example 60 includes the three dimensional display apparatus of any of examples 49-59, including or excluding optional features. In this example, the apparatus includes means for using the eye location information to calculate an optimal eye box size and to offset displayed images to align a center of an eye box with eye location of the person.

Example 61 includes the three dimensional display apparatus of any of examples 49-60, including or excluding optional features. In this example, the apparatus includes means for converting the rendered or captured color plus depth images or light field images to display images using one or more post-processing technique.

Example 62 includes the three dimensional display apparatus of example 61, including or excluding optional features. In this example, the one or more post processing technique includes screen-space ray tracing.

Example 63 includes the three dimensional display apparatus of any of examples 49-62, including or excluding optional features. In this example, the apparatus includes means for providing the display images to the display.

Example 64 includes the three dimensional display apparatus of any of examples 49-63, including or excluding optional features. In this example, the apparatus includes display backlight means for steering light alternating between a left and right eye based on the tracked eye location information at a refresh rate that is higher than a human perceivable refresh rate.

Example 65 is a machine readable medium including code, when executed, to cause a machine to perform the method or realize an apparatus of any preceding example.

Example 66 is an apparatus including means to perform a method as in any preceding example.

Example 67 is machine-readable storage including machine-readable instructions, when executed, to implement a method or realize an apparatus as in any preceding example.

Example 68 is a three dimensional display system including a processor and a display apparatus as in any preceding example.

Although example embodiments of the disclosed subject matter are described with reference to circuit diagrams, flow diagrams, block diagrams etc. in the drawings, persons of ordinary skill in the art will readily appreciate that many other ways of implementing the disclosed subject matter may alternatively be used. For example, the arrangements of the elements in the diagrams, and/or the order of execution of the blocks in the diagrams may be changed, and/or some of the circuit elements in circuit diagrams, and blocks in block/flow diagrams described may be changed, eliminated, or combined. Any elements as illustrated and/or described may be changed, eliminated, or combined.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

Program code may represent hardware using a hardware description language or another functional description language which essentially provides a model of how designed hardware is expected to perform. Program code may be assembly or machine language or hardware-definition languages, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, one or more volatile and/or non-volatile memory devices, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine-readable medium may include any tangible mechanism for storing, transmitting, or receiving information in a form readable by a machine, such as antennas, optical fibers, communication interfaces, etc. Program code may be transmitted in the form of packets, serial data, parallel data, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter. For example, in each illustrated embodiment and each described embodiment, it is to be understood that the diagrams of the figures and the description herein is not intended to indicate that the illustrated or described devices include all of the components shown in a particular figure or described in reference to a particular figure. In addition, each element may be implemented with logic, wherein the logic, as referred to herein, can include any suitable hardware (e.g., a processor, among others), software (e.g., an application, among others), firmware, or any suitable combination of hardware, software, and firmware, for example.

What is claimed is:

1. A three dimensional display apparatus comprising:
a micro lens array having a focal length and a lens pitch;
an eye tracker to provide eye location information corresponding to a tracking of eyes of a user; and
at least one processor to:
at least one of render or capture at least one of a color plus depth image or a light field image,
convert the at least one of color plus depth image or light field image to a display image based on the eye location information, the display image to be provided to a display,
determine a distance between the micro lens array and a user eye viewpoint based on the eye location information, determine a first eye box size based on the distance, the focal length of the micro lens array, the lens pitch of the micro lens array, and a pixel pitch of the display, and calculate a second eye box size based on the eye location information, the second eye box size smaller than the first eye box size, the display image to be viewed through an eye box having the second eye box size.

2. The three dimensional display apparatus of claim 1, the at least one processor to render the light field image based on the eye location information.

3. The three dimensional display apparatus of claim 1, further including a display backlight to steer backlight based on the eye location information.

4. The three dimensional display apparatus of claim 1, wherein the display has a pixel density higher than 250 pixels per inch.

5. The three dimensional display apparatus of claim 1, wherein the micro lens array has an F number larger than 8.

6. The three dimensional display apparatus of claim 1, wherein the eye tracker is a pupil tracker to track one or more pupils, and wherein the eye location information includes pupil location information.

7. The three dimensional display apparatus of claim 1, wherein the eye tracker is a three dimensional eye tracker and the eye location information includes three dimensional eye location information.

8. The three dimensional display apparatus of claim 1, wherein the at least one processor includes a graphics engine.

9. The three dimensional display apparatus of claim 1, wherein the at least one processor is to convert at least one of the color plus depth image or the light field image to a stereo integral image to be provided to the display.

10. The three dimensional display apparatus of claim 1, wherein the at least one processor is to render at least one of a plurality of color plus depth images or a plurality of light field images according to the tracked location of one or more of the eyes.

11. The three dimensional display apparatus of claim 1, wherein the at least one processor is to render at least one of the color plus depth image or the light field image based on the eye location information.

12. The three dimensional display apparatus of claim 1, wherein the at least one processor is to offset displayed images to align a center of the eye box with eye location of one or more of the eyes.

13. The three dimensional display apparatus of claim 1, wherein the at least one processor is to convert at least one of the color plus depth image or the light field image to display images using one or more post-processing techniques.

14. The three dimensional display apparatus of claim 13, wherein the one or more post processing techniques include screen-space ray tracing.

15. The three dimensional display apparatus of claim 1, wherein the at least one processor is to provide the display images to the display.

16. The three dimensional display apparatus of claim 1, further including a display backlight to steer light alternating between the eyes based on the tracked eye location information at a refresh rate that is higher than a human perceivable rate.

17. The three dimensional display apparatus of claim 1, wherein the distance between the display and the micro lens array is set to the focal length of the micro lens array.

18. The three dimensional display apparatus of claim 1, the at least one processor to calculate the second eye box size to correspond with a size of a pupil of one or more of the eyes.

19. The three dimensional display apparatus of claim 1, the at least one processor to calculate the second eye box size based on
an integral image pitch size.

20. A method comprising:
tracking one or more eyes viewing a micro lens array and a display to provide eye location information;
at least one of rendering or capturing at least one of color plus depth or light field images;
converting at least one of the color plus depth images or the light field images to display images based on the eye location information, the display images to be provided to the display;
determining a distance between the micro lens array and a user eye viewpoint based on the eye location information;
determining a first eye box size based on the distance, a focal length of the micro lens array, a lens pitch of the micro lens array, and a pixel pitch of the display; and
calculating a second eye box size based on the eye location information, the second eye box size smaller than the first eye box size, the display image to be viewed through an eye box having the second eye box size.

21. The method of claim 20, further including steering light alternating between the eyes based on the tracked eye location information at a refresh rate that is higher than a human perceivable rate.

22. The method of claim 20, further including setting the distance between the display and the micro lens array to the focal length of the micro lens array.

23. At least one non-transitory machine readable storage device comprising instructions that, when executed, cause one or more processor to at least:
track one or more eyes viewing a micro lens array and a display to provide eye location information;
at least one of render or capture at least one of color plus depth images or light field images;
convert at least one of the color plus depth images or the light field images to display images based on the eye location information, the display images to be provided to the display;
determine a distance between the micro lens array and a user eye viewpoint based on the eye location information,
determine a first eye box size based on the distance, a focal length of the micro lens array, a lens pitch of the micro lens array, and a pixel pitch of the display, and
calculate a second eye box size based on the eye location information, the second eye box size smaller than the first eye box size, the display image to be viewed through an eye box having the second eye box size.

24. The at least one storage device of claim 23, wherein the instructions, when executed, cause the one or more processors to render the light field images based on the eye location information.

25. The at least one storage device of claim 23, wherein the instructions, when executed, cause the one or more processors to track one or more pupils viewing the micro lens array and the display screen to provide pupil location information, wherein the eye location information includes pupil location information.

26. The at least one storage device of claim 23, wherein the instructions, when executed, cause the one or more processors to render the color plus depth based on the eye location information.

27. The at least one storage device of claim 23, wherein the instructions, when executed, cause the one or more processors to steer light alternating between the eyes based on the tracked eye location information at a refresh rate that is higher than a human perceivable rate.

28. The at least one storage device of claim 23, wherein the instructions, when executed, cause the one or more processors to calculate the second eye box size based on a size of a pupil of one or more of the eyes.

29. The at least one storage device of claim 23, wherein the instructions, when executed, cause the one or more processors to calculate an eye box size based on
   an integral image pitch size.

30. An apparatus comprising:
   means for tracking one or more eyes viewing a micro lens array and a display to provide eye location information;
   processing means for:
      at least one of rendering or capturing at least one of color plus depth images or light field images,
      converting at least one of the color plus depth images or the light field images to display images based on the eye location information, the display images to be provided to the display,
      determining a distance between the micro lens array and a user eye viewpoint based on the eye location information,
      determining a first eye box size based on the distance, a focal length of the micro lens array, a lens pitch of the micro lens array, and a pixel pitch of the display, and
      calculating a second eye box size based on the eye location information, the second eye box size smaller than the first eye box size, the display image to be viewed through an eye box having the second eye box size.

31. The apparatus of claim 30, wherein the processing means is to render means for rendering light field based on the eye location information.

32. The apparatus of claim 30, wherein the processing means is to steer light alternating between the eyes based on the tracked eye location information at a refresh rate that is higher than a human perceivable rate.

* * * * *